Jan. 8, 1957   J. D'A. CLARK   2,776,685
METHOD FOR MANUFACTURING CROSSCUT FIBROUS
ELEMENTS FOR STRUCTURES
Filed Aug. 19, 1953   3 Sheets-Sheet 1
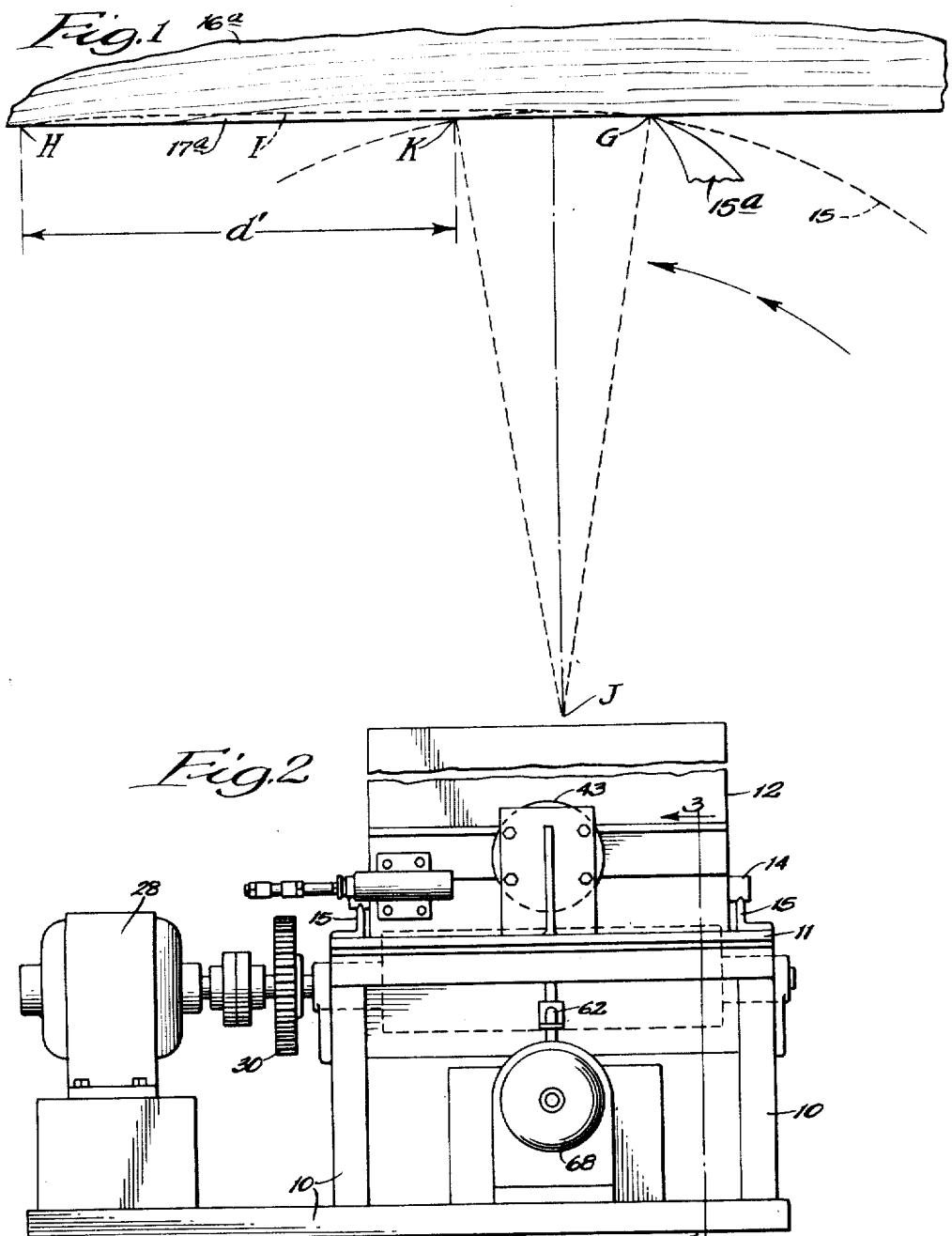
INVENTOR:
James d'A. Clark,
BY
Orme, McDougall, Williams & Hersh,
ATTORNEYS.

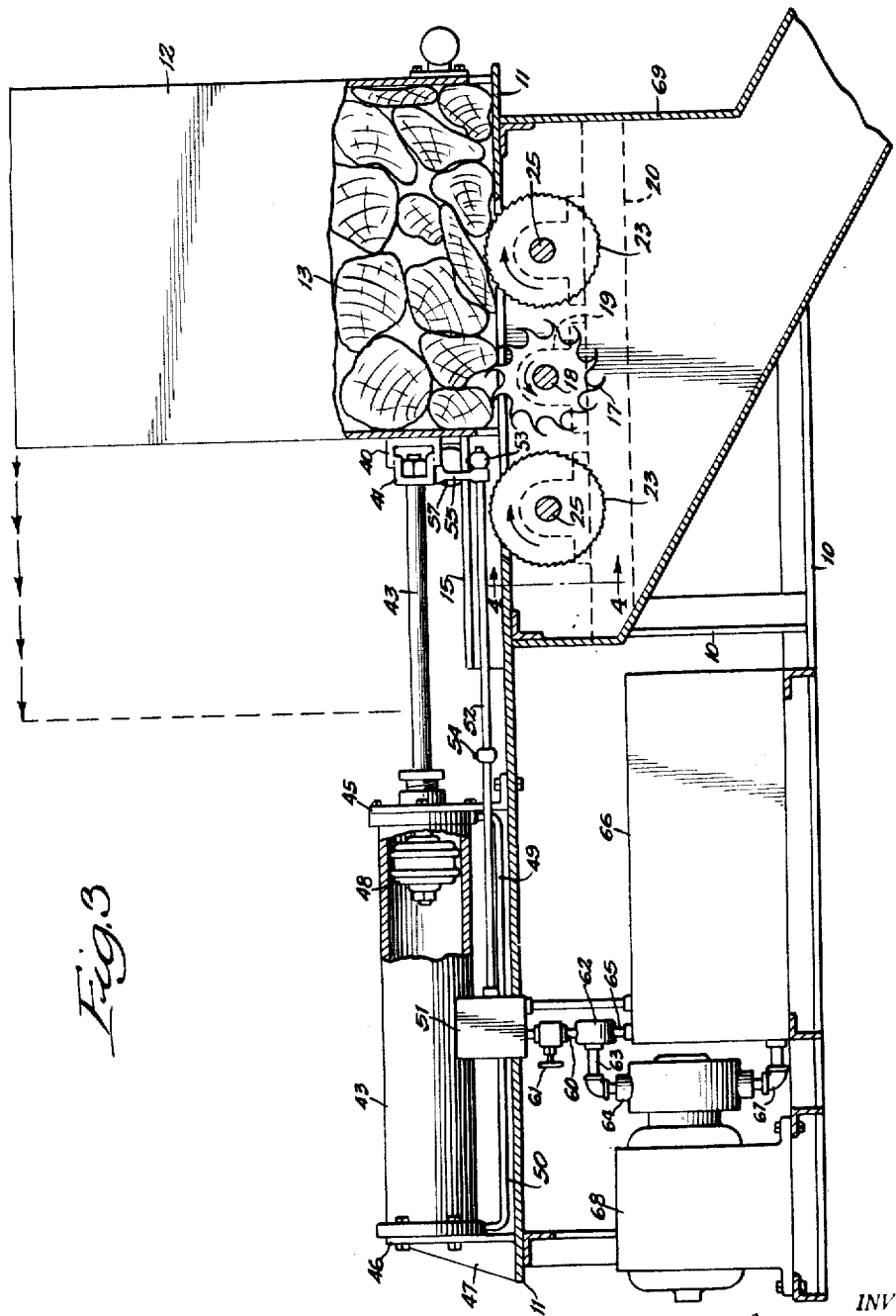

Jan. 8, 1957  J. D'A. CLARK  2,776,685
METHOD FOR MANUFACTURING CROSSCUT FIBROUS
ELEMENTS FOR STRUCTURES
Filed Aug. 19, 1953  3 Sheets-Sheet 3
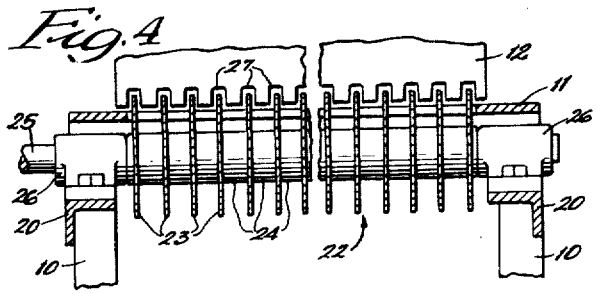
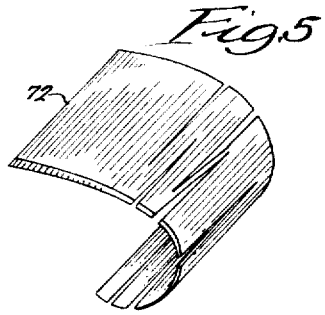
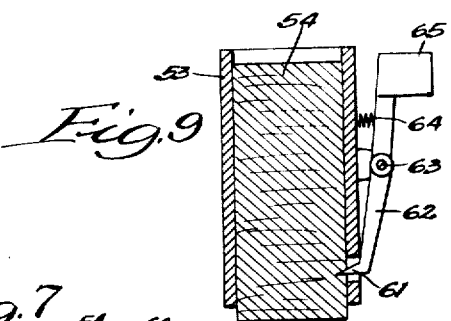
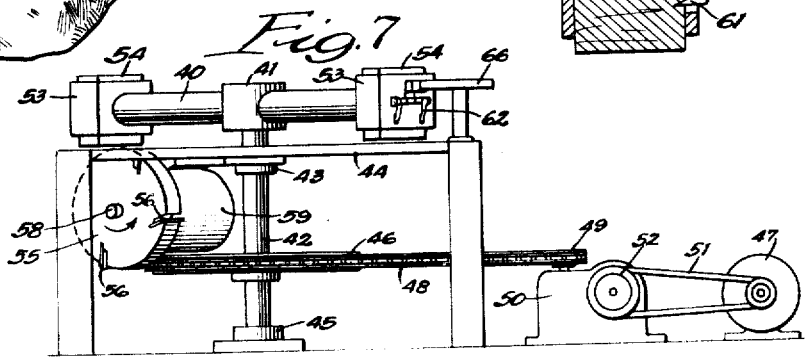
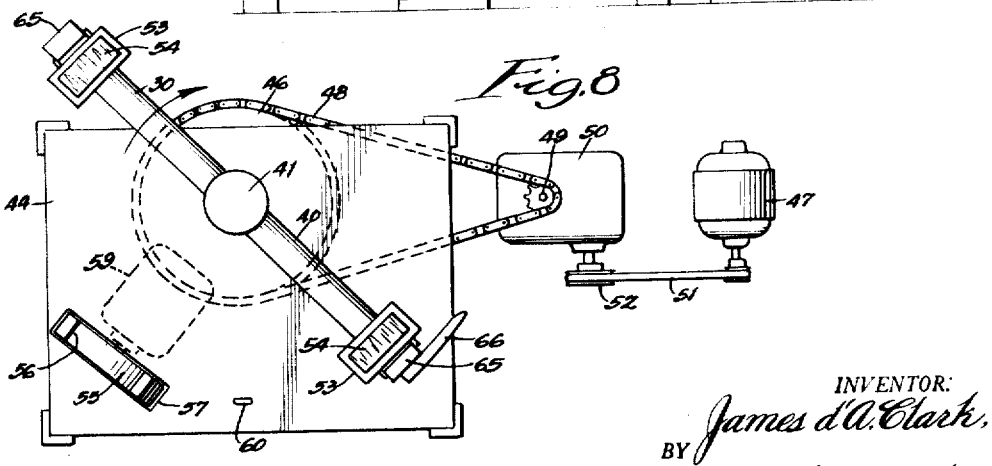
INVENTOR:
James d'A. Clark,
BY
Ooms, McDougall, Williams & Hersh,
ATTORNEYS

United States Patent Office 2,776,685
Patented Jan. 8, 1957

2,776,685

METHOD FOR MANUFACTURING CROSSCUT FIBROUS ELEMENTS FOR STRUCTURES

James d'A. Clark, Uplands, Victoria, British Columbia, Canada, assignor to Changewood Corporation, Chicago, Ill., a corporation of Illinois Application August 19, 1953, Serial No. 375,152

2 Claims. (Cl. 144—309)

This invention relates to the manufacture of fibrous elements such as wafers formed by cutting woody material parallel to and across the grain of the wood as distinguished from parallel to and along the grain of the wood.

This invention is an improvement of my copending applications Ser. No. 78,692, filed February 28, 1949, now Patent No. 2,655,189, and reference is also made to the copending application Ser. No. 94,812 filed May 23, 1949, now Patent No. 2,689,092.

When fibrous elements of the type described are cut parallel to and along the grain of the wood, there is a tendency for the wafers to curl as they are formed. Such curling inevitably is accompanied by cracking and checking of the individual fibrous elements in a manner which is clearly visible, particularly on microscopic examination. When cutting along the grain there is sometimes also a tendency for the cutting blade to chatter which results in the production of wafers having checked or chipped surfaces. Fibrous elements so formed are intrinsically weak and subject to fracture along any one of the numerous induced defects in its structure.

To overcome the foregoing and other defects of the prior art, it is the primary object of the present invention to provide a method for reducing a fibrous material such as wood in which the material is cut parallel to and across its grain rather than along the grain so as to form fibrous elements which are separated cleanly from the matrix and which are not checked, cracked, or broken by the defibering operation, and further by adding and mixing a little resinous binder with them, and subjecting them to heat and pressure, to form an unusually strong board.

In accordance with the present invention, the foregoing and other objects are attained by providing one or more cutters of suitable construction, or one which may operate in conjunction with a scoring mechanism, positioning blocks of wood of random dimensions with the grain of the wood running parallel to the cutter blade, and traversing the wood with respect to the cutter or the cutter with respect to the wood, thus making a cut substantially across the grain of the wood rather than along it. This shaves off thin slices, or wafers, having a width determined by the width of the cutter or the spacing of the scoring. The thickness and length of the slices will be determined by such factors as the cutter speed, the number of teeth on the cutter, and the rate of speed if the cutter is a rotary cutter, or by the projection of the knife if the cutter is a straight cutter. The individual wafers consist of a multiplicity of individual fibers lying substantially parallel to each other. Although the wafers are curled within the inner face of the cutter, the constituent fibrous elements are not broken or checked since the direction of the curl is longitudinally of the fibers rather than transversely thereof. As a result, such breaking as does occur takes place along the natural planes of cleavage of the wood structure, separating the individual fibers rather than breaking them transversely into fragments. In this manner, the effective width and strength of the fibrous elements along their width are preserved.

These and other objects and advantages of this invention will hereinafter appear, and for purposes of illustration, but not of limitation, embodiments of the invention are shown in the accompanying drawings in which:

Figure 1 is a schematic illustration of the manner of forming fibrous elements from a piece of wood by the presently disclosed method;

Figure 2 is an end elevation of the apparatus of Figure 1 for producing fibrous elements;

Figure 3 is a side elevation, partly in section, along the line 3—3 of Figure 2, of a unit for reducing blocks of wood to thin wafers or flakes;

Figure 4 is a detail view taken along the line 4—4 of Figure 3;

Figure 5 is a perspective view of a fibrous wafer produced by the apparatus shown in Figure 3;

Figure 6 is a fragmentary view of the surface of a board made by consolidating the fibrous product of the present invention and illustrating the characteristic pattern thereof when the wood has been prescored to form wafers of uniform width;

Figure 7 is an elevational view of a modification in a device for producing fibrous elements in accordance with the practice of this invention;

Figure 8 is a top plan view of the apparatus shown in Figure 7, and

Figure 9 is an enlarged sectional elevational view of a hopper shown in Figures 7 and 8.

The unit for reducing the wood to fibrous elements may comprise any suitable apparatus providing means for traversing scored pieces of wood crosswise against a rotary cutter which shaves off slices or wafers cut parallel to and across the grain. Suitable apparatus thus may comprise a rotary defiberer of the type shown in Figures 4 and 5 of the aforementioned application Ser. No. 78,692. This apparatus provides for the traversal of a rotary cutter and scoring element mounted on a rotating circular table with respect to a plurality of pieces of wood supported by the surface of the table and contained in a stationary hopper forming thin slices of substantially uniform thickness with usually both ends tapered and with or without square sides, depending upon the positioning of the scoring members or the shape of the cutters.

It is desirable to provide a method of and a rotary cutting apparatus for producing fibrous elements which are relatively long as compared with their thickness, which are cut substantially parallel to and across the grain of the wood, and which have tapered ends. It is further desirable to provide a method of and apparatus for reducing wood into fibrous elements in which the width and thickness as well as the length of the fibrous elements produced may be controlled to within predetermined limits to form fibrous elements which are of optimum shape and characteristics for various applications, particularly the fabrication of boards. It is also desirable to provide an apparatus in which fibrous elements of controlled dimensions may be produced, economically, continuously, in large volume, and with a minimum production of wood dust, slivers, and fibrous elements of random shape.

The shape of the fibrous elements produced by the present method is illustrated in Figure 1, wherein a rotary cutter 15ª is depicted traversing the piece of wood 16ª, the tooth of the cutter 15ª engaging the wood to produce fibrous elements 17ª having the configuration GHI. It will be noted that the fibrous element 17ª is relatively long and thin, tapered at both ends and with a major portion cut substantially parallel to and across the grain. Its maximum thickness equals the depth of cut made by each tooth. Furthermore, as developed in application Ser. No. 78,692, its length is equal to the square root of the product of its thickness times the cutter diameter, plus a substantial traversing speed. In the method of the present invention, as illustrated in Figure 1, the cutter engages the wood as it rotates through the angle GJK to form fibrous element 17ª. During this time the traverse of the wood equals the distance $d'$, which adds considerably to the length of the fibrous element.

Since the length now has become a substantial function of the traversing speed, a convenient means is afforded for controlling the fibrous element length by varying the rate of traverse relative to the cutter speed. To increase the length of the fibrous elements, all that is necessary is to increase the traversing speed or decrease the peripheral speed of the cutter, or both. Conversely, to decrease the fibrous element length, the traversing speed may be decreased, the cutter speed increased, or both. This offers a simple but very effective manner of controlling the fibrous element length.

Not only may the fibrous element length be controlled by the practice of the present invention, but precise control also is afforded of the fibrous element width and thickness. The width may be controlled by scoring the wood in advance of the cutter, the desired width being obtained by selective spacing of the elements of the scoring device. Alternatively, it may be controlled by employing in place of a continuous cutter one which comprises a plurality of circular saws or cutting elements bolted or otherwise secured to a common axis. In this case, the fibrous element width will be determined to some degree by the thickness of the cutting elements. The fibrous element thickness may be controlled by varying the setting of the cutter to take either a light, intermediate, or heavy cut as desired. In this manner, there may be produced a fibrous element of various but controlled and uniform dimensions which is best suited to conform to predetermined specifications. For use in the manufacture of molded boards, the fibrous elements should be cut to less than 5 inches in length or width and it is preferred to make use of fibrous elements cut to lengths of about ¼ to 1½ inches. The thickness of the fibrous elements may vary from 0.001 to 0.1 inch but it is best to make use of fibrous wafers having a thickness ranging from 0.015 to 0.65 inch when the fibers have tapered side edges and to make use of fibrous wafers having a thickness ranging from 0.001 to 0.015 inch when the side edges of the crosscut wafers are blunt.

Alternatively and particularly when it is desired to produce only short thin fibrous elements, ranging from say 0.001 to 0.01 inch, the cutting means employed in the present unit may comprise a rotary cutter usually operated in cooperation with scoring elements and with reciprocal means for traversing wood blocks crosswise of the grain against the cutter and scoring heads. In this embodiment, which is illustrated in Figures 2–4, inclusive, a frame indicated generally at 10 supports a flat, substantially rectangular table 11. Above the table is the hopper 12. This is open at the top and bottom and is adapted to be filled with blocks of wood 13 of random shape and size but placed with the grain running transversely of the table. The hopper 12 is held with its bottom spaced apart from the upper surface of the table 11, and is mounted for reciprocal movement by means of the slides 14—14 attached to opposite sides of the hopper and riding on the guides or tracks 15—15 attached to the table 11.

The cutting assembly is mounted below the table 11, the cutting elements and, if used, the scoring elements projecting upwardly through openings in the table sufficiently to engage the wood in the hopper as the latter reciprocates across the table surface. The cutter 17 is of conventional construction preferably being of the saw tooth type, as illustrated, or of the type wherein cutting blades are bolted or otherwise affixed to a central core. In either case, the cutting edges are substantially continuous and of sufficient length to be coterminous with the transverse inside dimension of the hopper. The cutter is mounted on the shaft 18 which, in turn, in journalled in bearings 19—19 bolted to the bracket bars 20—20 attached to the frame of the apparatus.

The scoring elements which may be used in conjunction with the cutter 17 by acting upon the surface of the wood to score or cut it and in this manner determine the length of the wafers cut by the cutters may comprise assemblies of properly spaced saws or knives. As is shown in Figure 3, one of these assemblies may be stationed on each side of the cutter head so that, during the reciprocating action of the hopper, the surface of the wood will be scored in advance of the cutter no matter what the direction of the traverse.

In the embodiment illustrated particularly in Figure 4, the scoring elements 22 comprise an assembly of circular saws 23 separated by spacers 24, both saws and spacers being mounted on a common shaft 25. The latter is journalled in bearings 26—26 which are bolted to the bracket bars 20—20 on the frame of the apparatus. To accommodate the saws as the hopper passes thereover during its reciprocation, there may be provided in the front and back ends thereof a plurality of slots 27 in which the saws rotate freely.

Separate drives may be provided for the cutter 17 and the scorers 22—22 or all three of these units may be coupled together and driven from a common motor. Thus the shaft 18 of the cutter may be coupled directly to an electric motor 28 and may carry the gear 29 engaging gears 30—30 of suitable ratio on the shafts 25—25 of the scoring elements.

As indicated above, the product formed by the action of the rotary cutter 17 on the wood blocks 13 comprises a multiplicity of thin flakes or wafers 72, shown in Figure 5, cut across the grain of the wood. The flakes are composed of a large number of individual fine fibrous elements having lengths determined principally by the transverse dimension of the flakes and lying parallel to each other. The individual fibers of the fibrous elements are substantially unbroken since the flakes are cut away cleanly by the cutting edges of the cutter and are not checked and cracked or broken by being cut lengthwise along the grain or by being torn loose forcibly from the woody matrix as is the case when applying the defibering mechanisms of the prior art.

In Figures 7 and 8 of the drawings, illustration is made of another form of apparatus which is simple in construction and easy in operation for the manufacture of small quantities of fibrous elements of the type described. As shown, the apparatus comprises a plurality of horizontally disposed arms 40 extending radially from a central hub 41 fixed onto the upper end portion of a vertically disposed shaft 42 which extends through an opening 43 in the central portion of a horizontally disposed table or platform 44. The lower end portion of the shaft 42 is journalled in a bearing 45 in which it is rotated by means of a sprocket wheel 46 fixed to an intermediate portion of the shaft 42 below the table 44. The sprocket wheel 46 is operatively connected to a driving motor 47 by means of a chain or belt 48 operatively connecting the sprocket wheel 46 to a spindle 49 on a reducing gear system 50 and by a belt 51 which connects a sheave 52 of the reducing gears with the driving motor 47.

Mounted on the end portion of the arms are hoppers 53 which are open at the top and at the bottom for insertion of wooden blocks 54 to be reduced into fibrous elements of the type described by cutting knives 55 extending crosswise from the periphery of a disc wheel 56 extending through an opening 57 in the table 44 in the path of the hoppers 53 during rotational movement to engage the wooden blocks extending from the underside thereof. The disc wheel 56 is mounted on a radially extending shaft 58 positioned below the table and adapted to be separately driven by a motor 59. One or more such cutting discs may be provided to sever wafers from the underside of the blocks as they are carried over the cutter by the arms 30. The underside of the blocks are adapted to be scored by stationary knives 60 extending upwardly from the surface of the table in alignment to engage the underside of the wooden blocks as they pass thereover.

The wooden blocks are firmly held within the housing to avoid chattering or displacement during scoring or cutting operations by means of cutting elements in the form of toothed lugs 61 on the end of a rocker arm 62 pivoted intermediate its ends on a pin 63 fixed to the outer wall of the hopper 53 and about which the arm rocks between operative position wherein the teeth 61 extend through openings in the side wall of the hopper adjacent the lower end into engagement with the blocks of wood and retracted position wherein the teeth are withdrawn from the openings to enable the wooden blocks to fall freely by gravitational force into engagement with the underlying surface of the table. The rocker arm 62 is urged towards operative position by spring means 64 located between the upper end of the arm and the hopper wall and it is actuated to retracted position upon engagement between an arm 65 extending outwardly from the upper end of the arm 62 and a curvilinear bracket 66 fixed to be engaged by the arm 65 during passage of the hopper over a portion of the table in adance of the scoring and cutting elements.

In operation, blocks of wood are introduced into the hopper with the grain extending parallel to the surface of the table and in the radial direction. As the hopper is carried by the arm 30 over the surface of the table in advance of the scoring elements 60, the arm 65 is engaged by the cam bracket 66 to rock the lever arm 63 to retracted position whereby the teeth 61 are withdrawn from the opening so that the block of wood can drop by gravitational force into engagement with the surface of the table. As the arms continue to rotate, the block of wood, which is stationarily held within the hopper, is carried over the elements 60 which score the underside of the wood to define the widths of the elements to be cut and then the arm 30 carries the hopper over the surface of the table into engagement with the cutting wheel 56 which is rotated in the direction shown by the arrow in Figure 7 so that the knives cut into the wood parallel to and across the grain for severing wafers therefrom.

Thus by the present invention there is provided for the first time an apparatus for reducing economically large volumes of scrap wood into fibrous elements all of the dimensions of which may be determined as desired. The fibrous elements, moreover, are relatively elongated, tapered on one or both ends, and cut substantially parallel to and across the grain. These properties make them admirably suited to the fabrication of a variety of felted and consolidated wood products such as hard, molded boards and panels. Their significance in determining board properties is illustrated in the following example of the manufacture of a molded hard board with fibrous elements prepared in accordance with the practice of this invention.

If a board is made by reducing kiln dried Douglas Fir wood to wafers 0.005 inch thick, about ¼ inch long and 1 inch wide under the specified conditions, mixing the fibrous elements with enough water to give 15 percent by weight of moisture, and thoroughly mixing with 5 percent by weight of powdered or liquid phenolic resin, and sifting the material through a coarse screen into a mold to give a uniform layer of material, pressing resulting mat between heated platens (at 350° F.) for sufficient time to thermoset the resin with sufficient pressure to give a board having a density of 1.0 (comparable to that of water), it will have a modulus of rupture of approximately 8000 p. s. i. If, however, scoring is omitted, thus not predetermining the width of the elements, and by rubbing, the crosscut slivers are reduced to fibrous elements having lengths not over that of the width of the wafers, the resulting board made otherwise identically will have a modulus of rupture of less than 7000 p. s. i.

It is preferable to use binders in the form of dry powders of a thermosetting resinous material which are used by dusting onto the surfaces of the wafers in amounts ranging from 1 to 5 percent, depending upon the thickness of the wafers for use in the manufacture of composite molded board, and, as is usual in board manufacture, add 2 or 3 percent of a wax or resinous sizing agent.

It will be apparent that application of the crosscut fibrous elements of the present invention to the fabrication of boards has a significant and advantageous effect on the strength of the boards. By their use, boards may be made having rupture moduli two to three times greater than those of boards prepared under identical conditions from fibrous elements cut lengthwise of the grain and substantially greater than from fibrous elements produced by any other known means. This fact obviously is of the greatest significance in determining the commercial utilization of the boards.

It will be understood that changes may be made in the details of construction, arrangement and operation without departing from the spirit of the invention, especially as defined in the following claims.

I claim:

1. In a method of making a consolidated fibrous product from elements cut from wood, the step of making individual woody elements having a length and width less than 5 inches in either direction for random felting into a matrix used in forming a lamina of the consolidated product without the need for a preliminary reduction in their dimensions comprising cutting into a block of wood with a cutting edge disposed parallel to the length of the fibers in the wood with a cutting movement transverse said length to form an intact crosscut woody wafer having a thickness equal to the depth of cut.

2. In a method of making a consolidated fibrous product from elements cut from wood, the step of making individual woody elements having a length and width less than 5 inches in either direction for random felting into a matrix used in forming the body of the consolidated product without the need for a preliminary reduction in their dimensions comprising cutting into a block of wood with a cutting edge disposed parallel to the length of the fibers in the wood with a cutting movement transverse said length to form an intact crosscut woody wafer having a thickness equal to the depth of cut of between 0.001 to 0.1 inch.

References Cited in the file of this patent

UNITED STATES PATENTS

| Number | Name | Date |
|---|---|---|
| 233,765 | Innis | Oct. 26, 1880 |
| 666,211 | Shortt | Jan. 15, 1901 |
| 783,946 | Gregory | Feb. 28, 1905 |
| 796,545 | Watson | Aug. 8, 1905 |
| 950,011 | Stewart | Feb. 22, 1910 |
| 1,259,125 | Parker | Mar. 12, 1918 |
| 1,473,545 | Collier | Nov. 6, 1923 |
| 1,506,850 | Mange | Sept. 2, 1924 |
| 1,999,607 | Hagmaier | Apr. 30, 1935 |
| 2,355,512 | Contratto | Aug. 8, 1944 |
| 2,392,844 | Fairchild | Jan. 15, 1946 |
| 2,442,492 | Hassler | June 1, 1948 |
| 2,509,642 | Horsak | May 30, 1950 |
| 2,689,092 | Clark et al. | Sept. 14, 1954 |

UNITED STATES PATENT OFFICE
Certificate

Patent No. 2,776,685                                                   Patented January 8, 1957

James d'A. Clark

Application having been made jointly by James d'A. Clark, the inventor named in the patent above identified; Consolidated Board Development Company, Chicago, Illinois, a corporation of Delaware, the assignee; and Arthur L. Mottet of Longview, Washington, for the issuance of a certificate under the provisions of Title 35, Section 256 of the United States Code, adding the name of the said Arthur L. Mottet to the patent as a joint inventor, and a showing and proof of facts satisfying the requirements of the said section having been submitted, it is this 5th day of December 1961, certified that the name of the said Arthur L. Mottet is hereby added to the said patent as a joint inventor with the said James d'A. Clark.

[SEAL]

EDWIN L. REYNOLDS,
*First Assistant Commissioner of Patents.*